(12) United States Patent
Shin et al.

(10) Patent No.: US 11,604,037 B2
(45) Date of Patent: Mar. 14, 2023

(54) INTEGRATED CONNECTOR AND HEAT EXCHANGER INCLUDING THE SAME

(71) Applicant: Hanon Systems, Daejeon (KR)

(72) Inventors: Seung Hark Shin, Daejeon (KR); Dae Sung Noh, Gyeonggi-do (KR); Kug Seung Jo, Gyeonggi-do (KR); Woon Sik Kim, Gyeonggi-do (KR)

(73) Assignee: Hanon Systems, Daejeon (KR)

( * ) Notice: Subject to any disclaimer, the term of this patent is extended or adjusted under 35 U.S.C. 154(b) by 7 days.

(21) Appl. No.: 17/336,498

(22) Filed: Jun. 2, 2021

(65) Prior Publication Data

US 2021/0381781 A1 Dec. 9, 2021

(30) Foreign Application Priority Data

Jun. 4, 2020 (KR) ........................ 10-2020-0067693

(51) Int. Cl.
*F28F 9/02* (2006.01)
*B60H 1/32* (2006.01)
*F25B 43/04* (2006.01)

(52) U.S. Cl.
CPC ......... *F28F 9/0246* (2013.01); *B60H 1/3229* (2013.01); *F25B 43/04* (2013.01); *F25B 2339/00* (2013.01)

(58) Field of Classification Search
CPC ...... F28F 9/0246; B60H 1/3229; F25B 43/04; F25B 2339/00

USPC ........................................................ 165/173
See application file for complete search history.

(56) References Cited

U.S. PATENT DOCUMENTS

2006/0123837 A1* 6/2006 Shah ..................... F25B 39/04
29/890.07

FOREIGN PATENT DOCUMENTS

| KR | 101606475 B1 | | 3/2016 |
| KR | 20170047050 A | * | 5/2017 |
| KR | 20170047963 A | * | 5/2017 |

* cited by examiner

*Primary Examiner* — Mahmoud Gimie
(74) *Attorney, Agent, or Firm* — Norton Rose Fulbright US LLP; James R. Crawford

(57) ABSTRACT

Provided are an integrated connector and a heat exchanger including the same, which may prevent assembly defects and leaks of a heat exchanger because the connector may be manufactured with precise dimensions, and is easy to manufacture, by integrally forming the connector that connects and firmly couples a header tank and a gas-liquid separator so that a heat exchanger medium communicates in the heat exchanger such as a condenser, in which the integrated connector is formed by molding a first pipe portion inserted into a hole of the header tank, a first flange portion in surface contact with an outer surface of the header tank, a second pipe portion inserted into a hole of the gas-liquid separator, and a second flange portion in surface contact with an outer surface of the gas-liquid separator so as to be connected to one another and have an interior communicating with one another.

10 Claims, 20 Drawing Sheets

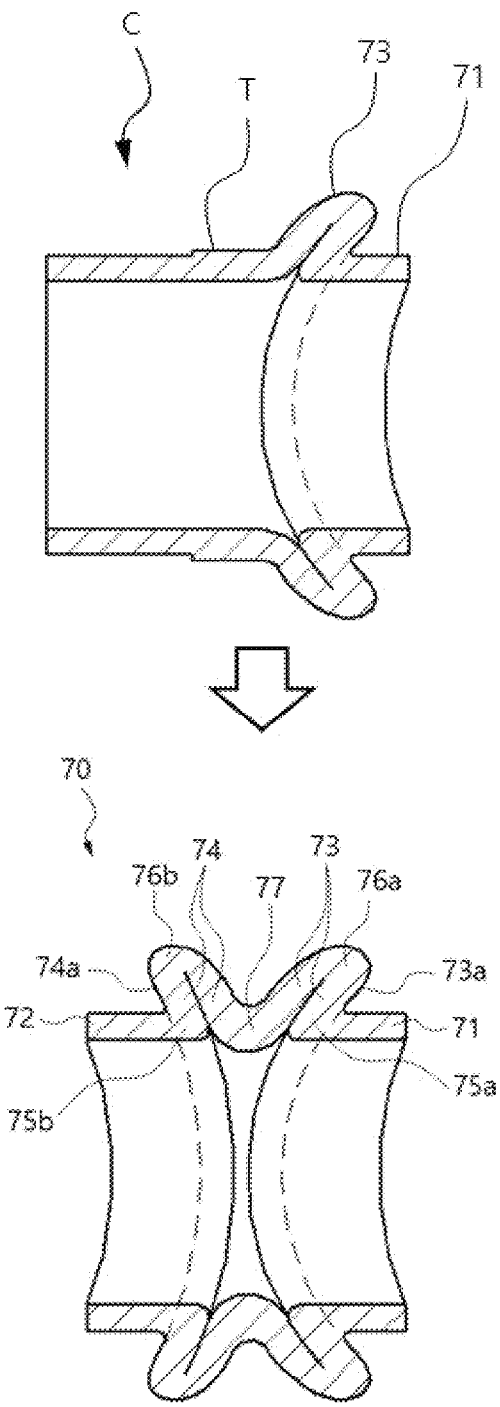

INTEGRATED CONNECTOR AND HEAT EXCHANGER INCLUDING THE SAME

CROSS-REFERENCE TO RELATED APPLICATIONS

This application claims priority under 35 U.S.C. § 119 to Korean Patent Application No. 10-2020-0067693, filed on Jun. 4, 2020, in the Korean Intellectual Property Office, the disclosure of which is incorporated herein by reference in its entirety.

TECHNICAL FIELD

The following disclosure relates to a connector for communicating a heat exchange medium by connecting a header tank and a gas-liquid separator in a heat exchanger such as a condenser, and a heat exchanger including the same.

BACKGROUND

Heat exchangers are apparatuses that absorb heat from one side and release the absorbed heat to the other side between two environments with a temperature difference, and a condenser among the heat exchangers is a heat exchanger that cools a refrigerant by exchanging heat with air or cooling water.

FIG. 1 is a front cross-sectional view illustrating a conventional condenser.

As illustrated, the conventional condenser may include a first header tank 10 and a second header tank 20 which are disposed to be spaced apart from each other and through which a refrigerant flows, a plurality of tubes 30 having both ends connected to the first header tank 10 and the second header tank 20 to communicate therewith, radiation fins 40 interposed and coupled between the tubes 30, and a gas-liquid separator 60 disposed to be spaced apart from the first header tank 10 and connected to the first header tank 10 through a connector 50 to communicate therewith.

In addition, in the connector 50, a portion of a pipe 51 on one side may be inserted into a hole of the first header tank 10, and a portion of a connection block 52 having a diameter larger than that of the pipe 51 may be firmly coupled to the first header tank 10 by blazing or the like to be in contact with an outer surface of the first header tank 10. Similarly, in the connector 50, a portion of a pipe 51 on the other side may be inserted into a hole of the gas-liquid separator 60, and a portion of a connection block 52 may be firmly coupled to the gas-liquid separator 60 by blazing or the like to be in contact with an outer surface of the gas-liquid separator 60.

Here, the connector 50 includes the pipe 51 manufactured by rolling a clad plate made of a metal material such as aluminum, and the connection block 52 having both surfaces processed in shapes corresponding to those of the outer surfaces of the first header tank 10 and the gas-liquid separator 60, respectively, and having a through hole into which the pipe 51 is inserted. The connector 50 is formed by manufacturing the pipe 51 and the connection block 52, respectively, and inserting the pipe 51 into the connection block 52 and then combining the connection block 52 and the pipe 51 into one.

However, when such a connector 50 is assembled by inserting the pipe 51 into the through hole of the connection block 52, a central axis of the pipe 51 may be inclined with respect to a central axis of the through hole of the connection block 52 or dispersion (deviation) may occur in a length of the pipe 51 protruding to both sides of the connection block 52. Accordingly, it is difficult to manufacture the connector with the precise dimensions, and when the first header tank 10, the connector 50, and the gas-liquid separator 60 are assembled and coupled, an assembly failure may occur. In addition, due to such a reason, since an area in which the outer surface of the first header tank 10 and the connection block 52 are in contact with each other and an area in which the outer surface of the gas-liquid separator 60 and the connection block 52 are in contact with each other are reduced, resulting in poor brazing, there is a problem that leaks may occur at the connection portions. In addition, the conventional connector 50 has to go through processes of manufacturing the pipe 51 in the tube shape by rolling the clad plate and then cleaning the pipe 51 when manufacturing the pipe 51, separately manufacturing and cleaning the connection block 52 through cold forging or the like, and assembling the pipe 51 and the connection block 52 and then cleaning the assembly, and then applying a flux to the assembly and drying the assembly again.

RELATED ART DOCUMENT

Patent Document

KR 10-1606475 B1 (2016.03.21)

SUMMARY

An embodiment of the present invention is to providing an integrated connector capable of manufacturing a connector that firmly couples a header tank and a gas-liquid separator while connecting the header tank and the gas-liquid separator so that a heat exchange medium is communicated such as a condenser among heat exchangers with the precise dimensions, and simplifying a process of manufacturing the connector, and a heat exchanger including the same.

In one general aspect, an integrated connector includes: a first pipe portion and a second pipe portion formed in a tubular shape; and a first flange portion and a second flange portion positioned between the first pipe portion and the second pipe portion, and formed in a form in which tubes are overlapped and stacked outwardly from opposite end portions of the first pipe portion and the second pipe portion, wherein the first pipe portion, the second pipe portion, the first flange portion, and the second flange portion are integrally formed to form an interior communicating with each other.

The integrated connector may further include a first bent portion connecting the first pipe portion and the first flange portion, and the second pipe portion and the second flange portion, respectively; a second bent portion connecting a stacked outer portion of the first flange portion in a radial direction and a stacked outer portion of the second flange portion in a radial direction; and a connection portion connecting the first flange portion and the second flange portion.

The first flange portion and the second flange portion may be in contact with each other at at least one or more points.

The connection portion connecting the first flange portion and the second flange portion may have a thickness greater than a thickness of the ends of the first pipe portion and the second pipe portion.

The first pipe portion, the second pipe portion, the first flange portion, and the second flange portion may be integrally formed in a form connected to one another through a forming process of forming the first flange portion and the second flange portion in a bent and overlapped form by compressing one tube.

The first flange portion may be formed in a form in which a portion of the first flange portion is inclined toward the first pipe portion, and the second flange portion may be formed in a form in which a portion of the second flange portion is inclined toward the second pipe portion.

The first flange portion may be formed to surround an outer circumferential surface of the first pipe portion, and the second flange portion may be formed to surround an outer circumferential surface of the second pipe portion.

A first seating surface of the first flange portion adjacent to the first pipe portion may be formed in a shape corresponding to an outer surface of one object to be in surface contact and coupled, and a second seating surface of the second flange portion adjacent to the second pipe portion may be formed in a shape corresponding to an outer surface of the other object to be in surface contact and coupled.

A thickness of one layer of the first flange portion and the second flange portion may be formed to be greater than a thickness of the ends of the first pipe portion and the second pipe portion.

In another general aspect, a heat exchanger includes: one or more header tanks in which a heat exchange medium is stored and flows; a core portion connected to the header tanks to allow the heat exchange medium to flow and heat exchange; a gas-liquid separator disposed to be adjacent to the header tanks and spaced apart from each other; and the integrated connector for connecting the header tanks and the gas-liquid separator to communicate with each other.

The integrated connector may be coupled by the first pipe portion being inserted into a hole of a first header tank, the first flange portion being in surface contact and coupled with an outer surface of the first header tank, the second pipe portion being inserted into a hole of the gas-liquid separator, and the second flange portion being in surface contact and coupled with an outer surface of the gas-liquid separator.

BRIEF DESCRIPTION OF THE DRAWINGS

FIG. 20 is a cross-sectional view illustrating a shape of a molding object before and after molding in a second forming step in the method for manufacturing the integrated connector according to an embodiment of the present invention.

DETAILED DESCRIPTION OF EMBODIMENTS

Hereinafter, an integrated connector of the present invention having the configuration as described above, a heat exchanger including the same, and a method and apparatus for manufacturing the integrated connector will be described in detail with reference to the accompanying drawings.

<Integrated Connector>

Figure 1:
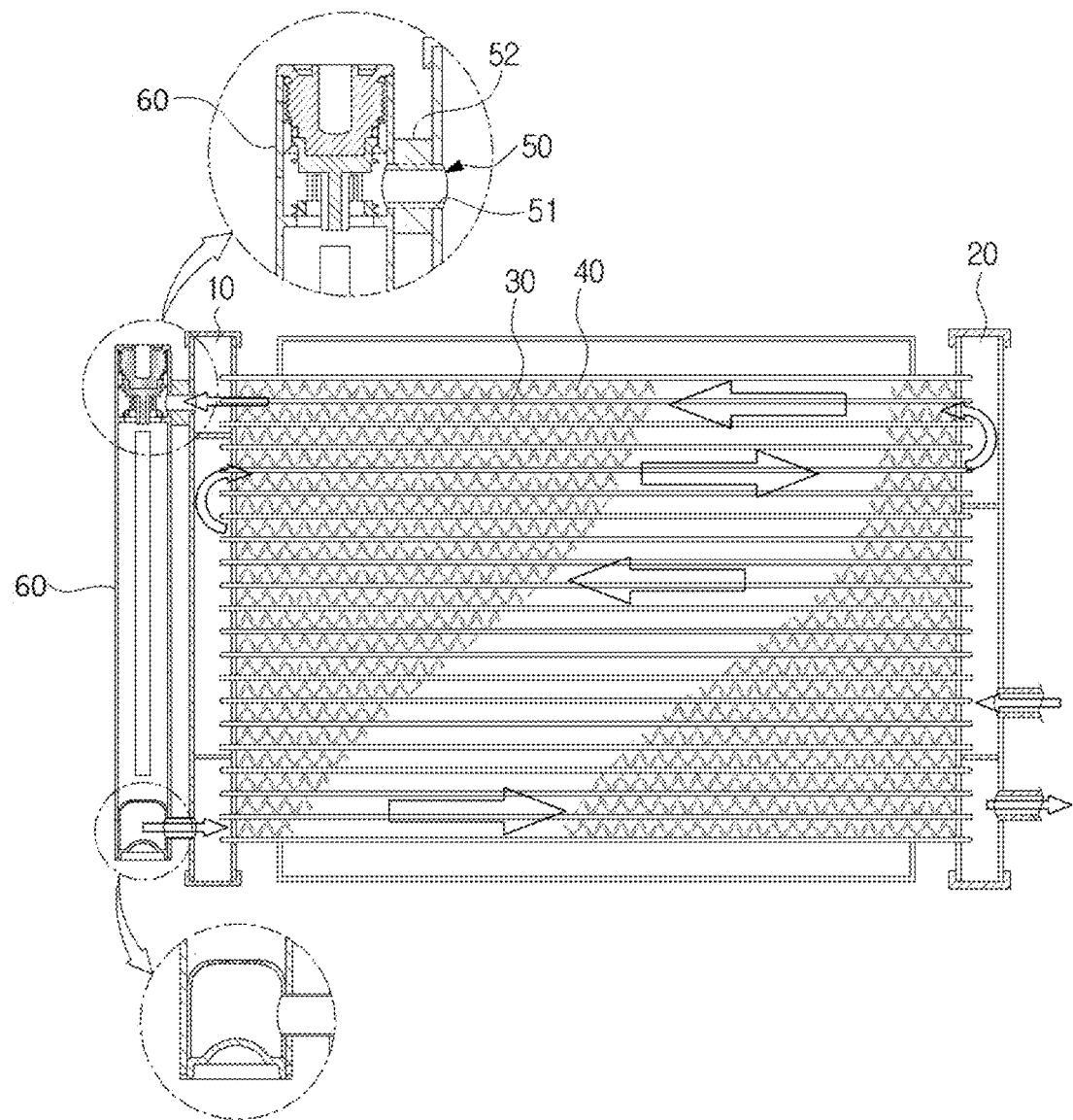
FIG. 1 is a front cross-sectional view illustrating a condenser among the conventional heat exchangers.
Figure 2:
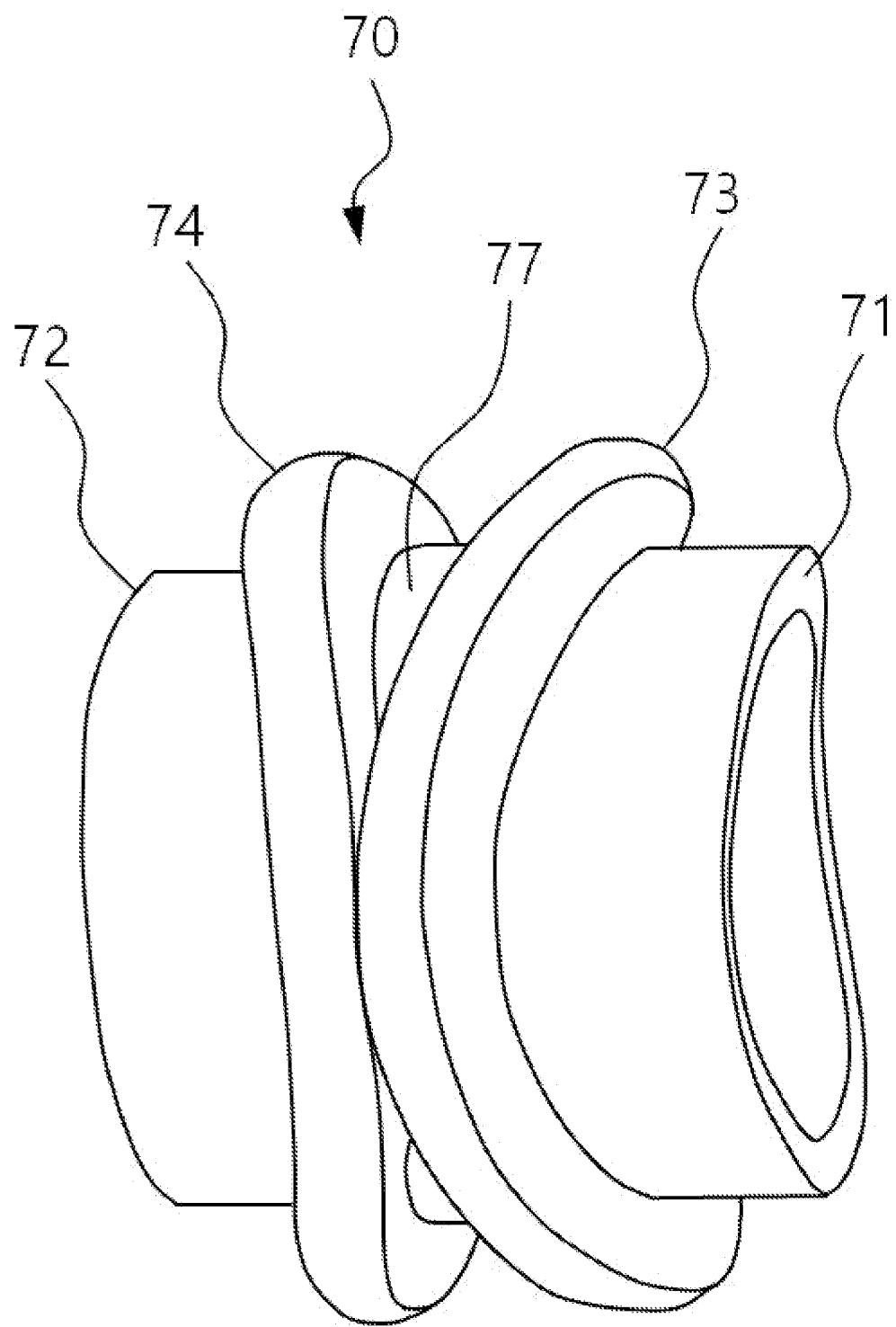
FIGS. 2 and 3 are photographs illustrating an integrated connector according to an embodiment of the present invention.
Figure 3:
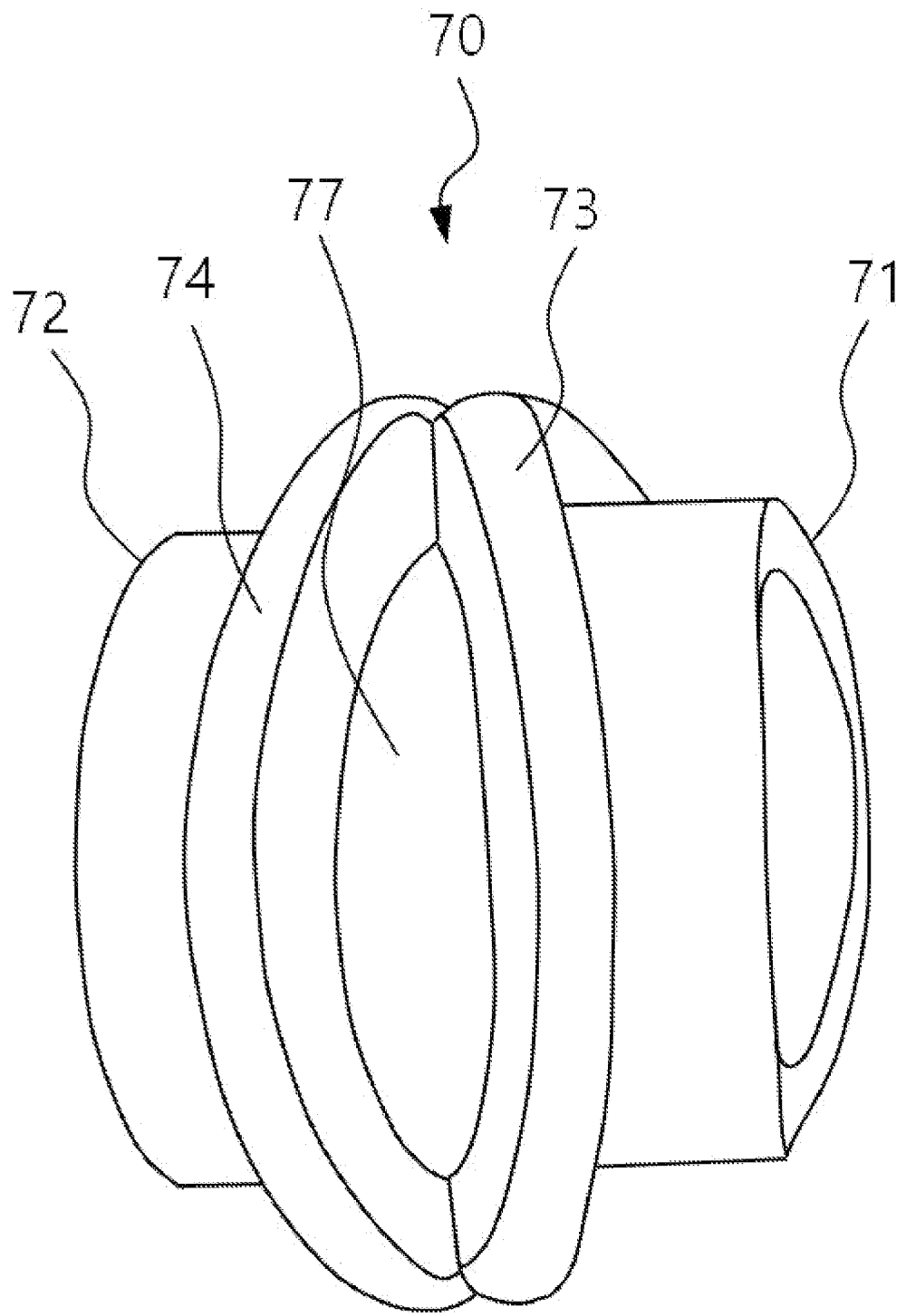
Figure 4:
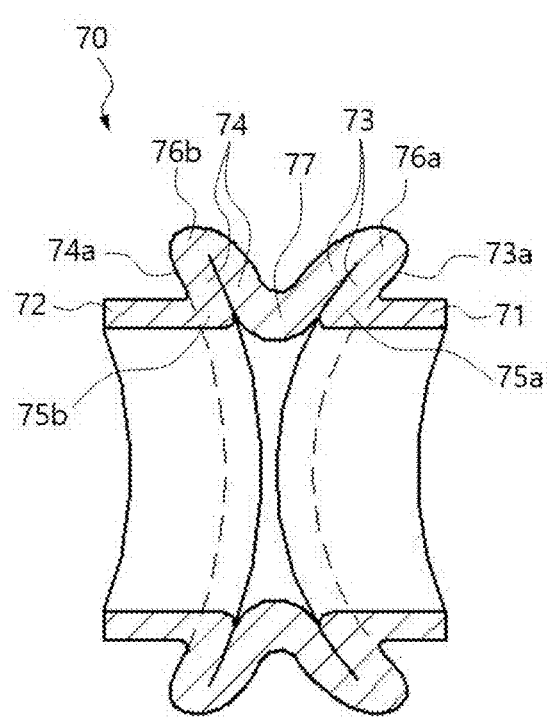
FIG. 4 is a front cross-sectional view of FIG. 2.

FIGS. 2 and 3 are photographs illustrating an integrated connector according to an embodiment of the present invention, and FIG. 4 is a front cross-section view of FIG. 2.

As illustrated, an integrated connector 70 according to an embodiment of the present invention may generally include a first pipe portion 71, a second pipe portion 72, a first flange portion 73, and a second flange portion 74, and may further include first bent portions 75a and 75b, second bent portions 76a and 76b, and a connection portion 77.

The first pipe portion 71 and the second pipe portion 72 may be formed in a tube shape so that a heat exchange medium may flow through the inside, and may be formed to communicate with each other. In addition, the first flange portion 73 and the second flange portion 74 may be disposed between the first pipe portion 71 and the second pipe portion 72, and the first flange portion 73 may be disposed adjacent to the first pipe portion 71 and the second flange portion 74 may be disposed adjacent to the second pipe portion 72. In addition, the first flange portion 73 and the second flange portion 74 may be formed to protrude outwardly from outer circumferential surfaces of the first pipe portion 71 and the second pipe portion 72, and may be formed in a form in which tubes are overlapped and stacked, respectively. The integrated connector 70 may have the first flange portion 73 and the second flange portion 74 that are integrally formed adjacent to each other in a form in which middle portions in a length direction is overlapped and stacked by pressing one tube in the length direction, where the first pipe portion 71 may be integrally extended from a right end of the first flange portion 73 to a right direction, and the second pipe portion 72 may be integrally extended from a left end of the second flange portion 74 to a left direction. At this time, the integrated connector may be manufactured in a desired size and shape through a process of compressing the tube using a tool manufactured in a shape to be molded in advance.

Figure 5:
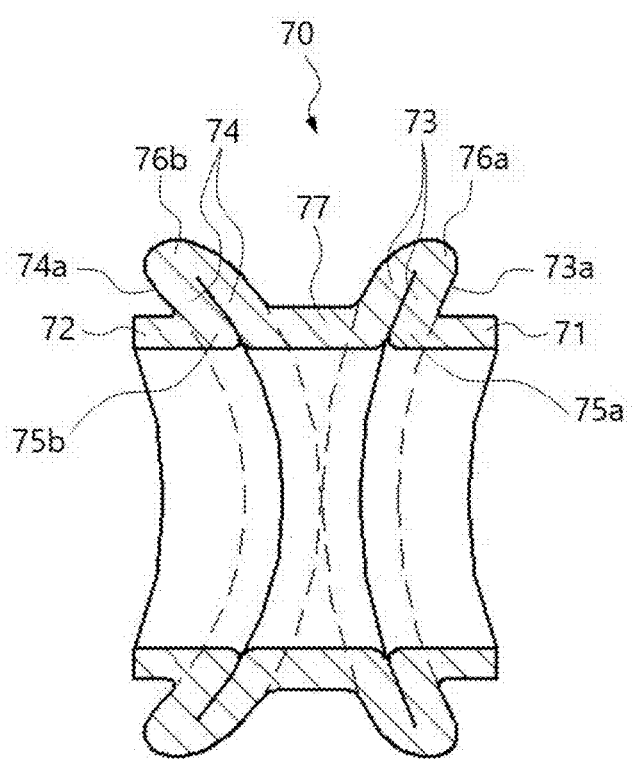
FIGS. 5 and 6 are cross-sectional views of the integrated connector according to an embodiment of the present invention cut at different angles.

As a result, the integrated connector 70 may be in the form in which the first pipe portion 71 is formed as a straight pipe starting from a right end of the first pipe portion 71 to a left end of the first pipe portion 71, the first flange portion 73 and the second flange portion 74 are formed to extend from the left end of the first pipe portion 71 toward the outside of the outer circumferential surface of the first pipe portion 71 in an approximately M-shape, and the second pipe portion 72 extends from a left end of the second flange portion 74 to the left as a straight tube. That is, the integrated connector 70 may be in the form in which the first pipe portion 71, the first flange portion 73, the second flange portion 74, and the second pipe portion 72 are connected to each other without a seam at portions connected to be adjacent to each other, and may be in the form in which both ends thereof are opened and the insides thereof are in communication with each other. In addition, in the integrated connector 70, a first bent portion 75a in which a left end of the first pipe portion 71 and the inside of a right one layer of the first flange portion 73 in a radial direction are connected in the bent form may be formed, and similarly, a first bent portion 75b in which a right end of the second pipe portion 72 and an inner side of a left one layer of the second flange portion 74 in a radial direction are connected in the bent form may be formed. In addition, the two layers of the first flange portion 73 may form a second bent portion 76a in which outer sides in the radial direction are connected in the bent form, respectively, and similarly, the two layers of the second flange portion 74 may also form a second bent portion 76b in which outer sides in the radial direction are connected in the bent form, respectively. In addition, a connection portion 77 in which an inner side of one left side of the first flange portion 73 in the radial direction and an inner side of one right layer of the second flange portion 74 in the radial direction are connected in the bent form may be formed. As a result, a structural rigidity of the first flange portion and the second flange portion 74 may be improved by the bent form of the first bent portions 75a, 75b, the second bent portions 76a, 76b, and the connection portion 77. In addition, as illustrated in FIG. 5, the connection portion 77 may be formed in a straight form between the first flange portion 73 and the second flange portion 74.

Figure 6:
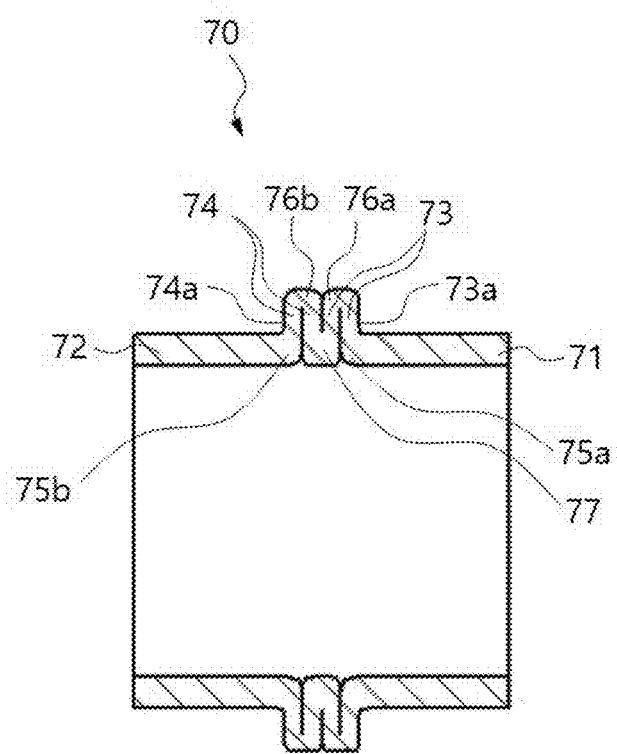

In addition, the first flange portion 73 and the second flange portion 74 may in contact with each other at at least one or more points. As an example, as illustrated in FIG. 6, the first flange portion 73 and the second flange portion 74 may be formed to be in contact with each other at two points of symmetrical positions, thereby improving the structural rigidity of the flange portions.

In addition, at least a portion of the first flange portion 73 may be formed in a shape inclined toward the first pipe portion 71, and at least a portion of the second flange portion 74 may be formed in a shape inclined toward the second pipe portion 72.

Here, a first seating surface 73a, which is an outer right surface of the first flange portion 73 adjacent to the first pipe portion 71, may be formed in a shape corresponding to an outer surface of one object to be coupled by surface contact, and as an example, the first seating surface 73a may be formed in a shape corresponding to a cylindrical shape. Similarly, a second seating surface 74a, which is an outer right surface of the second flange portion 74 adjacent to the second pipe portion 72, may be formed in a shape corresponding to an outer surface of the other object to be coupled by surface contact, and as an example, the second seating surface 74a may also be formed in a shape corresponding to a cylindrical shape. In this case, as illustrated, the first seating surface 73a and the second seating surface 74a may have different curvature radii from each other. In addition, the first seating surface 73a and the second seating surface 74a may be variously formed according to external shapes of the objects to be coupled by surface contact.

In addition, the first flange portion 73 may be formed in an annular shape that surrounds an outer circumferential surface of the first pipe portion 71 in a circumferential direction in a range of 360 degrees, and the second flange portion 74 may be formed in an annular shape that surrounds an outer circumferential surface of the second pipe portion 72 in a circumferential direction in a range of 360 degrees.

In addition, one layer of each of the first flange portion 73 and the second flange portion 74 may have a thickness greater than that of the first pipe portion 71 and the second pipe portion 72. In other words, since the first flange portion 73 and the second flange portion 74 are formed in the bent shape by pressing and stacking one pipe, the first flange portion 73 and the second flange portion 74 have sufficient compressive strength. Further, by preventing the clad layer that may be formed on the outer surface of the tube from being peeled off while being deformed by bending, bonding strength with a bonding surface by brazing may also be improved.

Thus, the integrated connector of the present invention may be manufactured in a desired shape and precise dimensions, and when assembled and coupled to the heat exchanger, it is possible to prevent assembly failure and leakage of the heat exchanger. In addition, the integrated connector of the present invention may be used as a pipe joint to allow fluid communication by connecting tubes such as hoses or pipes to each other, in addition to the heat exchanger.

<Heat Exchanger>

Figure 7:
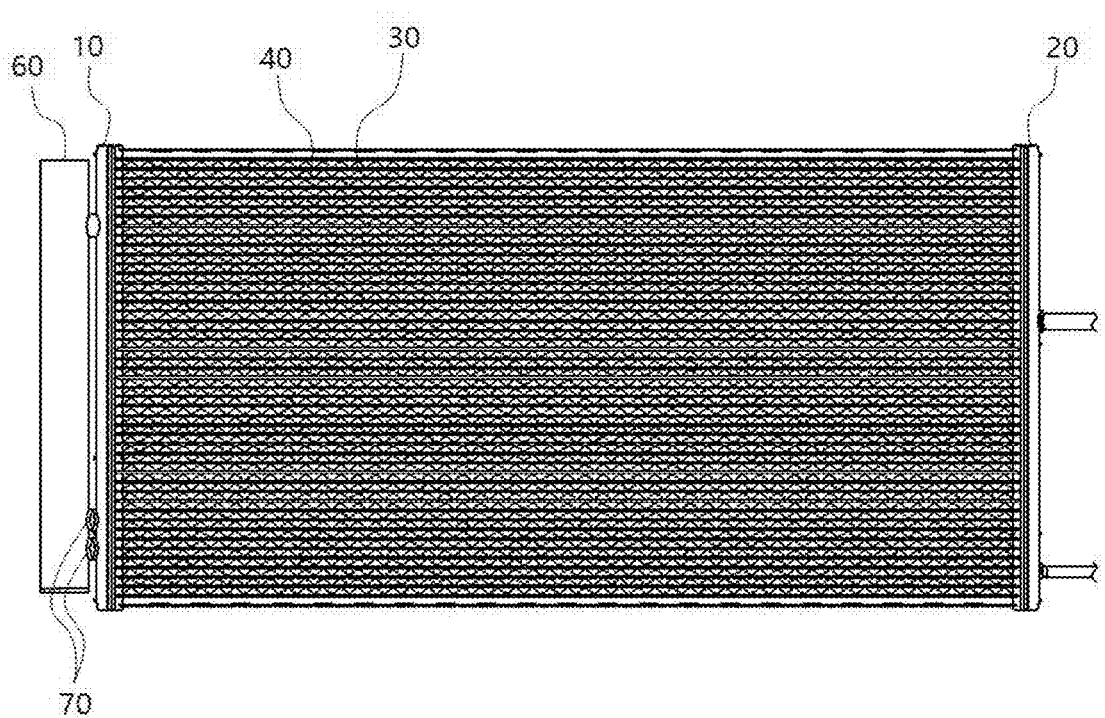
FIG. 7 is a front view illustrating a heat exchanger (condenser) including an integrated connector according to an embodiment of the present invention.
Figure 8:
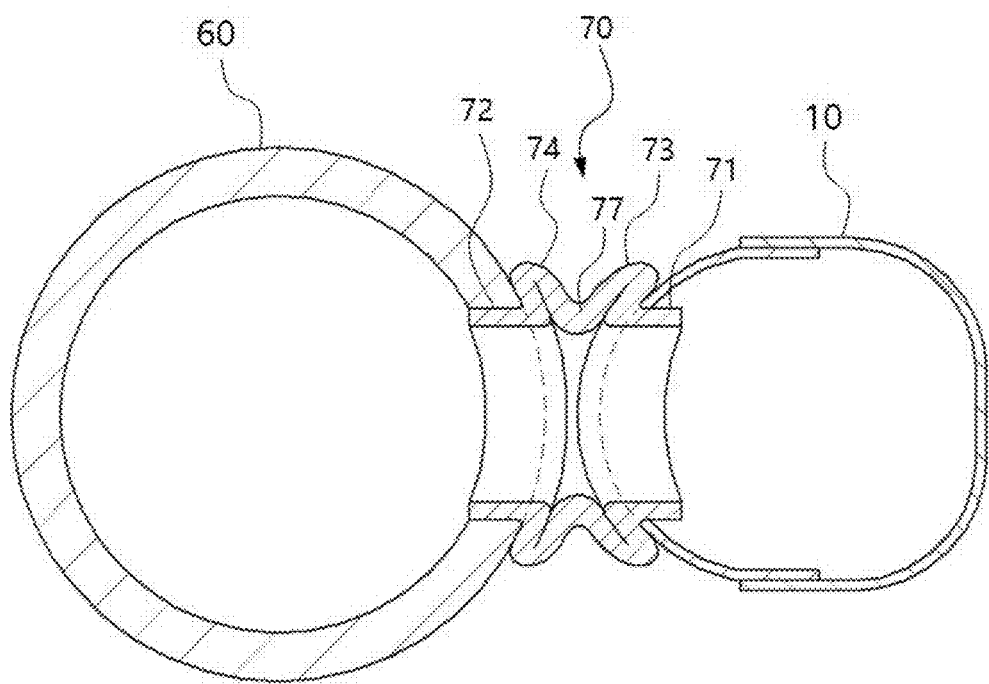
FIG. 8 is a cross-sectional view illustrating the integrated connector portion of FIG. 7.

FIG. 7 is a front view illustrating a heat exchanger (condenser) including an integrated connector according to an embodiment of the present invention and FIG. 8 is a cross-sectional view illustrating the integrated connector portion of FIG. 7.

As illustrated, the heat exchanger including the integrated connector according to an embodiment of the present invention may be a condenser, and may generally include a header tank including a first header tank 10 and a second header tank 20, a core portion including a plurality of tubes and radiation fins 40, which are portions where heat is substantially exchanged, a gas-liquid separator 60, and an integrated connector 70.

The first header tank 10 and the second header tank 20 may be formed in the form of a tube whose both ends are closed so that the heat exchange medium may be stored and flowed, and as an example, the first header tank 10 and the second header tank 20 may be spaced apart from each other and disposed side by side. In addition, in each of the first header tank 10 and the second header tank 20, a half-pipe type header and a tank are coupled to form a flow space of the heat exchange medium therein, and the header of the first header tank 10 and the header of the second header tank 20 may be disposed in a direction facing each other, and the tanks thereof may be disposed in an outward direction. In addition, the remaining portion of the tank of the first header tank 10 except for a portion inserted into and coupled to the header may have a cylindrical shape having an arc shape in cross section. In addition, in the second header tank 20, an inlet pipe through which the heat exchange medium is introduced and an outlet pipe through which the heat exchange medium is discharged may be formed, and in the first header tank 10 and the second header tank 20, baffles for partitioning a space therein are formed such that a flow path of the heat exchange medium may be determined by the baffles.

The plurality of tubes 30 are disposed to be spaced apart from each other side by side so that one end portion thereof is inserted into and coupled to the header of the first header tank 10, and the other end portion is inserted into and coupled to the header of the second header tank 20. Accordingly, the first header tank 10 and the second header tank 20 may be connected by the tubes 30 to communicate with each other.

The radiation fins 40 may be interposed between the tubes 30 and coupled to the tubes 30 by brazing or the like, and may serve to improve heat exchange efficiency by receiving heat from the heat exchange medium passing through the tubes 30 and releasing the heat to the outside.

The gas-liquid separator 60 may be formed in a cylindrical shape and may be disposed to be adjacent to the first header tank 10 and spaced apart from the first header tank 10 side by side. In addition, the gas-liquid separator 60 may serve to remove moisture contained in the heat exchange medium by the heat exchange medium being introduced from the first header tank 10, separate a liquid heat exchange medium from a gaseous heat exchange medium, and then transfer the liquid heat exchange medium to the first header tank 10.

In the integrated connector 70, the first pipe portion 71 may be inserted into a hole of the first header tank 10, and the first seating surface 73a, which is the right surface of the first flange portion 73, may be coupled to the first header tank 10 to be in surface contact with an outer circumferential surface of the tank of the first header tank 10. The second pipe portion 72 may be inserted into a hole of the gas-liquid separator 60, and the second seating surface 74a, which is the left surface of the second flange portion 74, may be coupled to the gas-liquid separator 60 to be in surface contact with an outer circumferential surface of the gas-liquid separator 60.

As a result, in the heat exchanger including the integrated connector of the present invention, since the first header tank and the gas-liquid separator communicate and are coupled using the integrated connector manufactured in a desired shape and precise dimensions, assembly failure may be prevented when assembling the first header tank, the integrated connector, and the gas-liquid separator, and airtightness may be reliably maintained at the portions where the first header tank, the integrated connector, and the gas-liquid separator are in contact with each other when being coupled by brazing or the like after assembly, thereby preventing leakage of the heat exchange medium in the heat exchanger.

Since the shapes of the surfaces in which the outer circumferential surface of the first header tank and the integrated connector are in contact with each other match, and the shapes of the surfaces in which the outer circumferential surface and the integrated connector are in contact with each other match, the coupling strength between the object to be coupled and the integrated connector may be increased. Accordingly, the thickness of the material for manufacturing the integrated connector may be reduced, thereby reducing the manufacturing cost. Here, in the integrated connector, the compression reinforced portion in the form of a tube before the first and second flanges are formed helps to form the wall thickness of the first and second flanges well, and the remaining portion of the material is formed as the connection portion between the first flange portion and the second flange portion, so that the thickness of the connection portion may be increased, thereby increasing structural strength and improving durability. Accordingly, even if the thickness of the pipe for manufacturing the integrated connector is reduced, sufficient strength and durability may be secured, and thus the material for manufacturing the integrated connector may be reduced, thereby reducing the manufacturing cost.

<Apparatus for Manufacturing Integrated Connector>

First, an apparatus for manufacturing an integrated connector according to an embodiment of the present invention may generally include a compression reinforcing apparatus 300, a first forming apparatus 100, and a second forming apparatus 200. Here, the first forming apparatus and the second forming apparatus may be collectively referred to as a saddle forming apparatus because the shape of the result formed using these apparatuses has a saddle shape, and a processing process using such an apparatus may be collectively referred to as saddle forming.

<Compression Reinforcing Apparatus>

Figure 9:
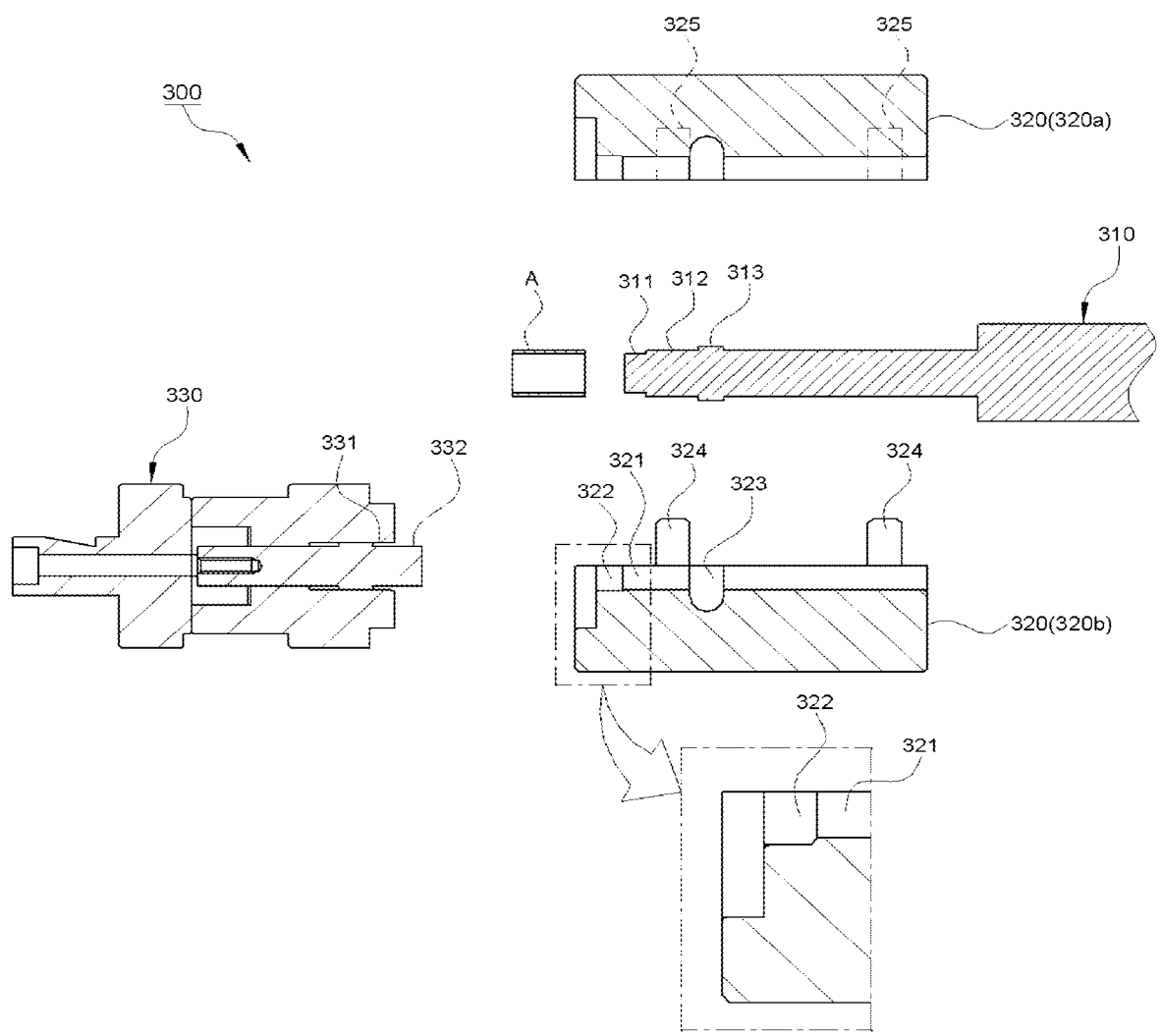
FIGS. 9 and 10 are cross-sectional views illustrating a compression reinforcing apparatus in an apparatus for manufacturing an integrated connector according to an embodiment of the present invention.
Figure 10:
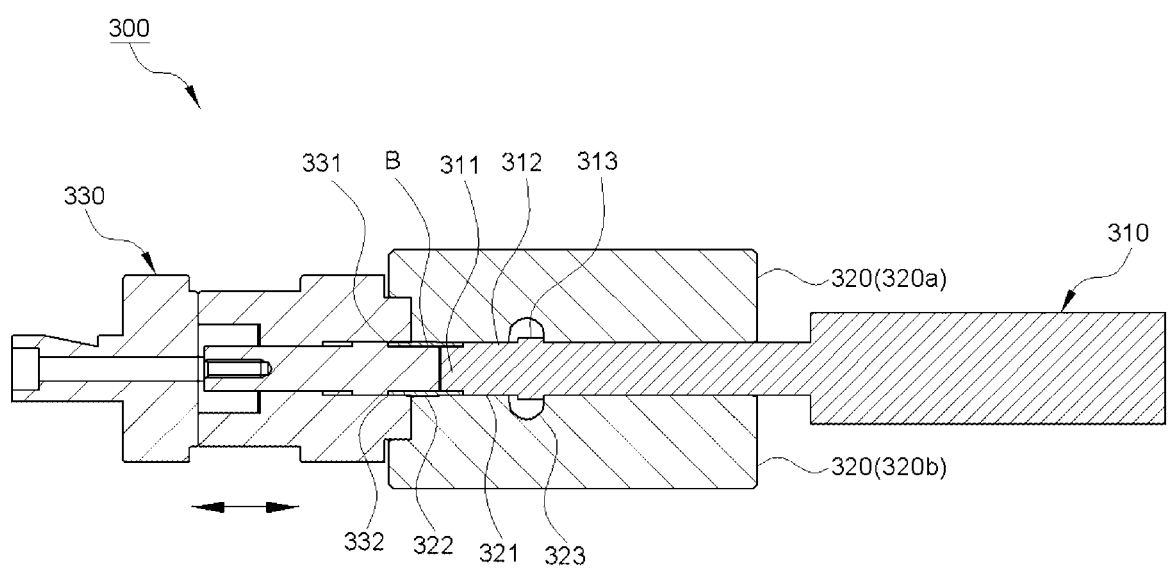
Figure 11:
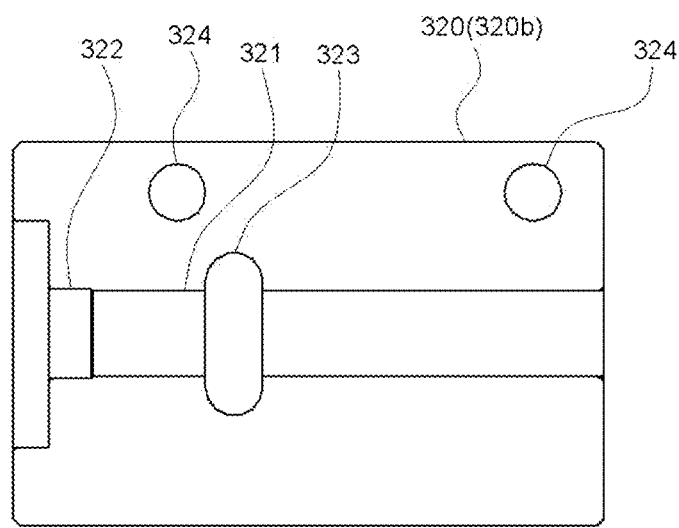
FIG. 11 is a plan view illustrating a clamp of the compression reinforcing apparatus in the apparatus for manufacturing the integrated connector according to an embodiment of the present invention.

FIGS. 9 and 10 are cross-sectional views illustrating a compression reinforcing apparatus in an apparatus for manufacturing an integrated connector according to an embodiment of the present invention, and FIG. 11 is a plan view illustrating a clamp of the compression reinforcing apparatus in the apparatus for manufacturing the integrated connector according to an embodiment of the present invention.

As illustrated, the compression reinforcing apparatus 300 is an apparatus for processing such that a wall of a tube A having a constant thickness, which is an object to be molded by plastic deformation, moves to the inner side (the opposite side to the side receiving the force) to increase the thickness by pressing and compressing a cylindrical tube with a constant thickness, which is the object to be molded, in the length direction.

The compression reinforcing apparatus 300 may include a fixing table 310, a clamp 320, and a punch 330. The fixing table 310 serves to fix the tube A having a constant thickness, which is an object to be molded. The fixing table 310 may have an insertion portion 311 formed at a left end portion thereof so that one side of the tube A having the constant thickness, which is the object to be molded, is inserted and fixed, and a stepped portion 312 having a larger diameter than that of the insertion portion 311 formed on a right side thereof to be adjacent to the insertion portion 311. In addition, a locking protrusion 313 may be formed at a right side of the stepped portion 312 to protrude to be larger than the diameter of the stepped portion 312 by being spaced apart from the stepped portion 312. In addition, on the right side of the locking protrusion 313, a handle in the form of a rod through which an operator may hold the fixing table 310 by hand may be formed, and due to the handle, in the case of mass production application, position movement, such as putting in and taking out by an automated facility, may be performed using a mechanical apparatus.

In addition, the tube A having the constant thickness, which is the object to be formed, may be a tube with a circular cross section, and the insertion portion 311, the stepped portion 312, the locking protrusion 313, and the handle portion of the fixing table 310 may also have the form of a round bar having a circular cross section. The clamp 320 serves to fix the fixing table 310 and the tube A having the constant thickness, which is the object to be molded, in a state in which the tube A having the constant thickness, which is the object to be molded, is inserted into the fixing table 310. The clamp 320 may be formed as a block having an overall appearance in the form of a hexahedron, and may include an upper clamp 320a and a lower clamp 320b. In addition, the upper clamp 320a and the lower clamp 320b may have corresponding types of fixing grooves 321 formed on the surfaces facing each other so that one side of the tube A having the constant thickness and the fixing table 310 are inserted and fixed, and may have expansion grooves 322 formed with a diameter larger than the diameter of the fixing groove 321 at portions corresponding to a region to be increased in thickness, which is a central portion of the tube having the constant thickness in a length direction. In addition, locking grooves 323 are formed to be more concave than the fixing groove 321 at a position corresponding to the locking protrusions 313 of the fixing table 310, and the locking protrusions 313 of the fixing table 310 are inserted into the locking grooves 323 of the clamp 320 and the fixing table 310 may be supported so as not to be pushed to the right. In addition, the lower clamp 320b may have guide pins 324 protruding convexly from an upper surface thereof, and guide holes 325 may be formed to be concave upward on a lower surface of the upper clamp 320a so that the guide pins 324 may be inserted. Accordingly, the upper clamp 320a and the lower clamp 320b may be accurately coupled to correspond to each other. The punch 330 may serve to pressurize and compress the other side of the tube A having the constant thickness exposed to the left side of the clamp 320 in the length direction in the state in which the tube A having the constant thickness is inserted into the fixing table 310 and fixed to the clamp 320. The punch 330 may have an insertion groove 331 formed to insert the other side of the tube A having the constant thickness thereinto, and a protrusion 332 formed to be inserted into the inner side of the tube A having the constant thickness at a center of the insertion groove 331. In addition, the punch 330 and the clamp 320 may be disposed to be spaced apart from each other in the length direction of the fixing table 310, and the punch 330 may be formed to be linearly movable in the length direction and may be mounted on the pressing means so as to press and compress the tube A having the constant thickness. At this time, the protrusion 332 of the punch 330 may be formed to protrude to a length corresponding to the expansion groove 322 of the clamp 320 when the punch 330 is in close contact with the clamp 320.

<First Forming Apparatus>

Figure 12:
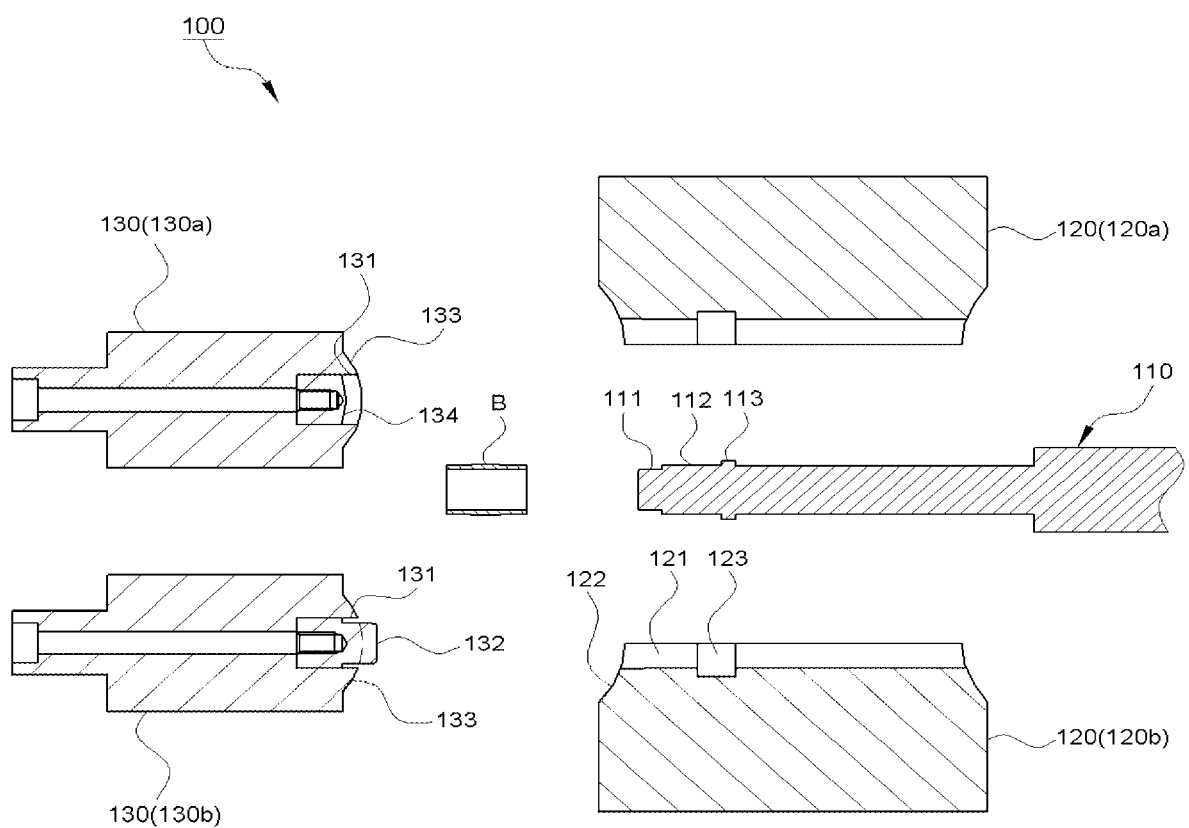
FIGS. 12 and 13 are cross-sectional views illustrating a first forming apparatus in the apparatus for manufacturing the integrated connector according to an embodiment of the present invention.
Figure 13:
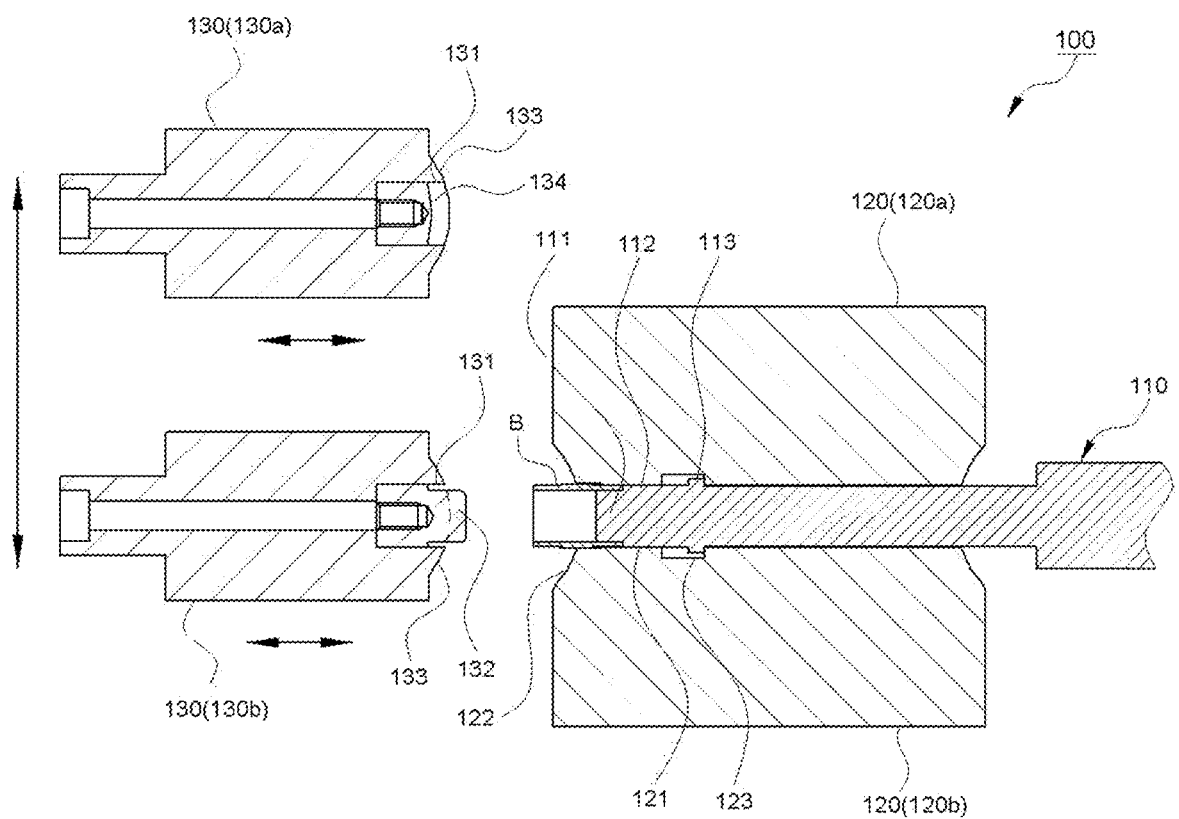
Figure 14:
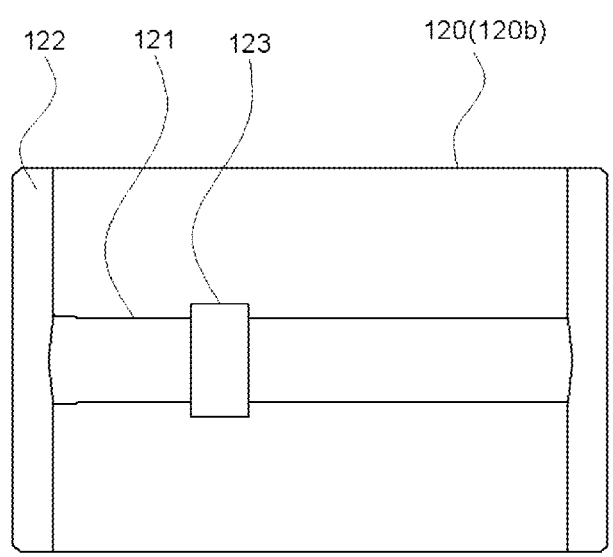
FIG. 14 is a plan view illustrating a first clamp of the first forming apparatus in the apparatus for manufacturing the integrated connector according to an embodiment of the present invention.

FIGS. 12 and 13 are cross-sectional views illustrating a first forming apparatus in an apparatus for manufacturing an integrated connector according to an embodiment of the present invention, and FIG. 14 is a plan view illustrating a first clamp of the first forming apparatus in the apparatus for manufacturing the integrated connector according to an embodiment of the present invention.

As illustrated, a first forming apparatus 100 is an apparatus for processing such that a first flange portion having an external appearance of a saddle shape while having a cross-sectional shape in which a portion of the tube is overlapped and stacked is formed, by pressing and compressing the tube B molded through the compression reinforcing apparatus 300 and having a relatively increased thickness of the central portion in the length direction. The first forming apparatus 100 may include a first fixing table 110, a first clamp 120, and a first punch 130. The first fixing table 110 serves to fix the tube B having an increased thickness of the central portion, which is the object to be molded. The first fixing table 110 may have a first insertion portion 111 formed at a left end portion thereof so that one side of the tube B having the increased thickness of the central portion, which is the object to be molded, is inserted and fixed, and a first stepped portion 112 having a larger diameter than that of the first insertion portion 111 formed to be adjacent to the right side of the first insertion portion 111. In addition, a first locking protrusion 113 may be formed at a right side of the first stepped portion 112 to protrude to be larger than the diameter of the first stepped portion 112 by being spaced apart from the first stepped portion 112. In addition, on the right side of the first locking protrusion 113, a handle in the form of a rod through which an operator may hold the first fixing table 110 by hand may be formed. In addition, the first insertion portion 111, the first stepped portion 112, the first locking protrusion 113, and the handle portion of the first fixing table 110 may have the form of a round bar having a circular cross section. The first clamp 120 serves to fix the first fixing table 110 and the tube B having the increased thickness of the central portion together in a state in which one side of the tube B having the increased thickness of the central portion is inserted into the first fixing table 110. The first clamp 120 may be formed as a block having an overall appearance in the form of a hexahedron, and may include a first upper clamp 120a and a first lower clamp 120b. In addition, the first upper clamp 120a and the first lower clamp 120b may have corresponding type of first fixing grooves 121 formed on the surfaces facing each other so that one side of the tube B having the increased thickness of the central portion and the first fixing table 110 are inserted and fixed, and may have 1-1-th molding surfaces 122, which are curved surfaces corresponding to the form to be molded on the left surfaces, which are regions on which the tube B having the increased thickness of the central portion is to be molded. In addition, first locking grooves 123 are formed to be more concave than the first fixing groove 121 at a position corresponding to the first locking protrusions 113 of the first fixing table 110, and the first locking protrusions 113 of the first fixing table 110 are inserted into the first locking grooves 123 of the first clamp 120 and the first fixing table 110 may be supported so as not to be pushed to the right. In addition, although not illustrated, like the clamp of the compression reinforcing apparatus, the first lower clamp 120b of the first clamp 120 may have guide pins protruding convexly from an upper surface thereof, and guide holes may be formed to be concave upward on a lower surface of the first upper clamp so that the guide pins may be inserted. Accordingly, the first upper clamp 120a and the first lower clamp 120b may be accurately coupled to correspond to each other. The first punch 130 may serve to press and compress a portion in which the tube B having the increased thickness of the central portion is exposed to the left side of the first clamp 120 in the length direction in the state in which the tube B having the increased thickness of the central portion is inserted into the first fixing table 110 and fixed to the first clamp 120. In addition, the first punch 130 may be disposed to be spaced apart from the first clamp 120 in the length direction of the first fixing table 110, may be formed to be linearly movable in the length direction, may be mounted on the pressing means so as to press and compress the tube B having the increased thickness of the central portion. Here, the first punch 130 may include a 1-1-th punch 130a and a 1-2-th punch 130b, and the 1-1-th punch 130a and the 1-2-th punch 130b may be configured to be selectively movable to a position at which the tube B having the increased thickness of the central portion may be pressed. In addition, the 1-1-th punch 130a may have a first insertion groove 131 into which the other side of the tube B having the increased thickness of the central portion may be inserted, and the first protrusion 132 may protrude from the center of the first insertion groove 131 so as to be inserted into the tube B having the increased thickness. In addition, the 1-1-th punch 130a may have a 1-2-molding surface 133 in which a right side adjacent to the first insertion groove 131 is formed as a curved surface corresponding to a shape to be molded. In addition, the 1-2-th punch 130a may have a first insertion groove 131 into which the other side of the tube B having the increased thickness of the central portion may be inserted, and a right side adjacent to the first insertion groove 131 may be formed as a 1-2-th molding surface 133. In addition, a first bottom surface 134 of the first insertion groove 131 of the 1-2-punch 130b may be concavely formed on the 1-2-th molding surface 133 in the form of a curved shape corresponding to the shape of the 1-2 molding surface 133.

<Second Forming Apparatus>

Figure 15:
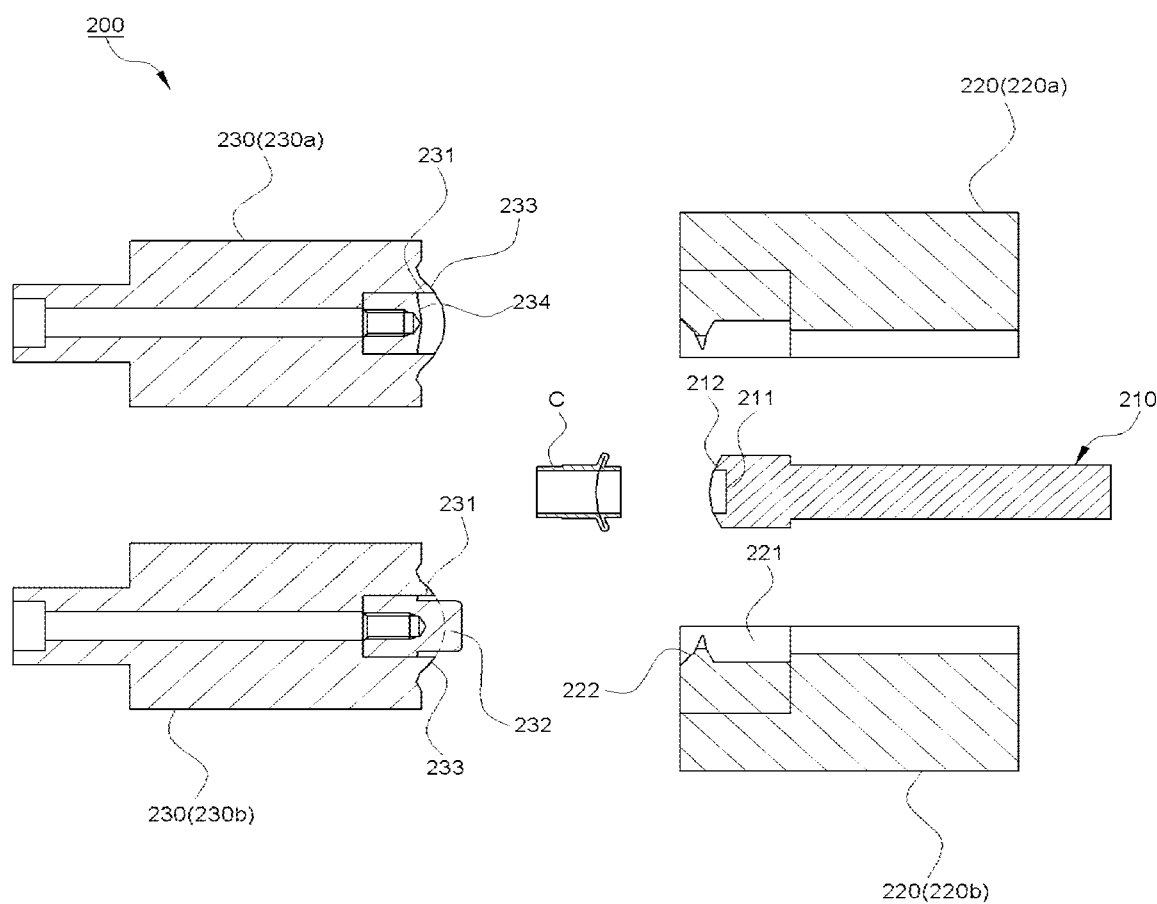
FIGS. 15 and 16 are cross-sectional views illustrating a second forming apparatus in the apparatus for manufacturing the integrated connector according to an embodiment of the present invention.
Figure 16:
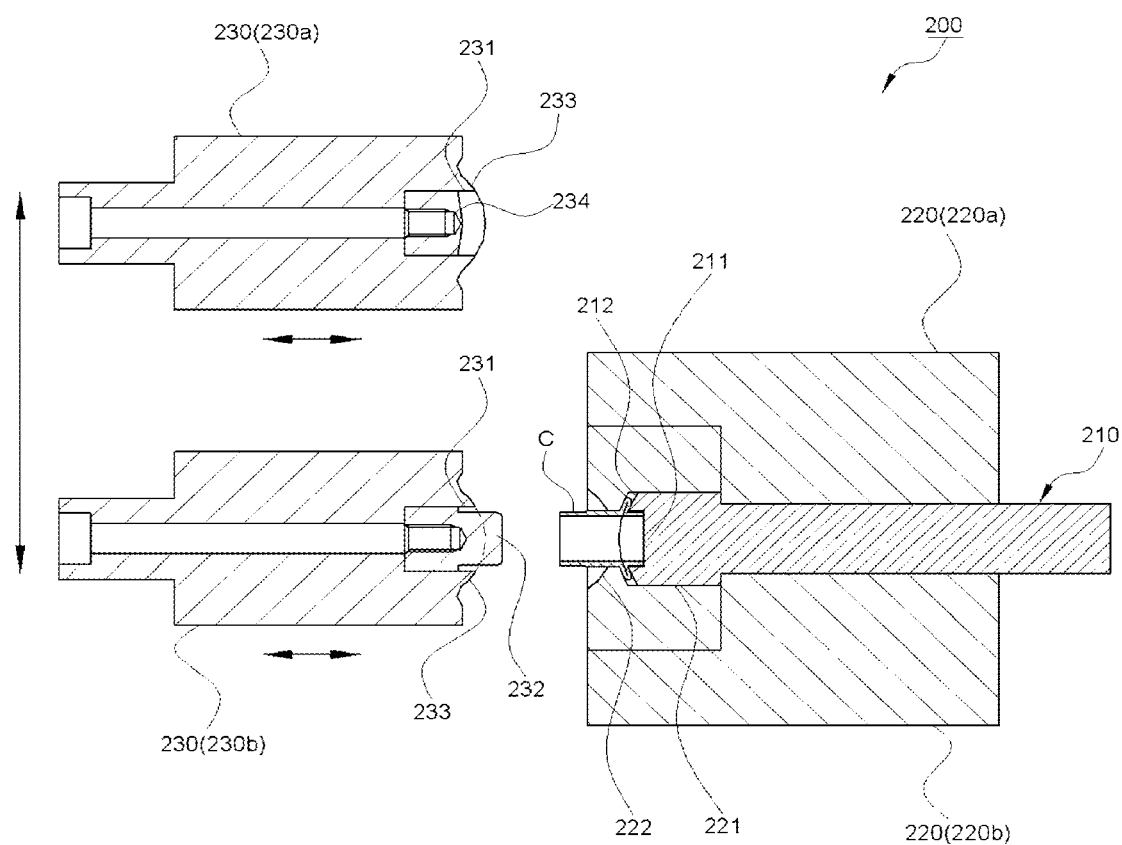
Figure 17:
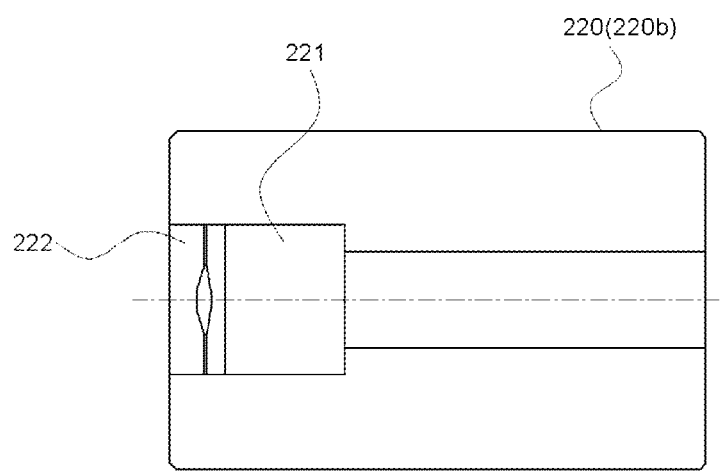
FIG. 17 is a plan view illustrating a second clamp of the second forming apparatus in the apparatus for manufacturing the integrated connector according to an embodiment of the present invention.

FIGS. 15 and 16 are cross-sectional views illustrating a second forming apparatus in an apparatus for manufacturing an integrated connector according to an embodiment of the present invention, and FIG. 17 is a plan view illustrating a second clamp of the second forming apparatus in the apparatus for manufacturing the integrated connector according to an embodiment of the present invention.

As illustrated, a first forming apparatus 100 is an apparatus for processing such that a second flange portion having an external appearance of a saddle shape while having a cross-sectional shape in which a portion of the tube is overlapped and stacked is further formed, by pressing and compressing a tube C molded through the first forming apparatus 100 described above and having the first flange portion 73 formed thereon in the length direction. The second forming apparatus 200 may include a second fixing table 210, a second clamp 220, and a second punch 230. The second fixing table 210 serves to fix the tube C having the first flange portion 73 formed thereon, which is the object to be molded. The second fixing table 210 may be formed with a second insertion groove 211 to which the other side of the tube C on which the first flange portion 73 is formed is inserted and fixed, and a support surface 212 formed to be adjacent to the second insertion groove 211 and corresponding to the shape of the first flange portion 73. In addition, a portion in which the second insertion groove 211 and the support surface 212 of the second fixing table 210 are formed may be formed in a rectangular shape in cross section, and to the right side thereof, a handle may be extended in the form of a round bar having a diameter smaller than that of a square shape. The second clamp 220 serves to fix the second fixing table 210 and the tube C on which the first flange portion 73 is formed together in a state in which the tube C on which the first flange portion 73 is formed is inserted into the second fixing table 210. The second clamp 220 may be formed as a block having an overall appearance in the form of a hexahedron, and may include a second upper clamp 220a and a second lower clamp 220b. In addition, the second upper clamp 220a and the second lower clamp 220b may have corresponding type of second fixing grooves 221 formed on the surfaces facing each other so that the first flange portion 73 of the tube C on which the first flange portion 73 is formed and the second fixing table 210 may be inserted and fixed, and may have 2-1-th molding surfaces 222, which are curved surfaces corresponding to the form to be molded on the left surfaces, which are regions on which the second flange portion is to be molded in the tube C on which the first flange portion 73 is formed. In addition, the second fixing table 210 may be supported so as not to be pushed to the right side because the portion in which the support surface 212 on the left side thereof is formed is caught in the second fixing groove 221 of the second clamp 220. In addition, although not illustrated, like the clamp of the compression reinforcing apparatus, the second lower clamp 220b of the second clamp 220 may have guide pins (not illustrated) protruding convexly from an upper surface thereof, and guide holes (not illustrated) may be formed to be concave upward on a lower surface of the second upper clamp 220a so that the guide pins may be inserted. Accordingly, the second upper clamp 220a and the second lower clamp 220b may be accurately coupled to correspond to each other. The second punch 230 may serve to press and compress a portion in which the tube C on which the first flange portion 73 is formed is exposed to the left side of the second clamp 220 in the length direction in the state in which the tube C on which the first flange portion 73 is formed is inserted into the second fixing table 210 and fixed to the second clamp 220. In addition, the second punch 230 may be disposed to be spaced apart from the second clamp 220 in the length direction of the second fixing table 210, may be formed to be linearly movable in the length direction, may be mounted on the pressing means so as to press and compress the tube C on which the first flange portion 73 is formed. Here, the second punch 230 may include a 2-1-th punch 230a and a 2-2-th punch 230b, and the 2-1-th punch 230a and the 2-2-th punch 230b may be configured to be selectively movable to a position at which the tube C on which the first flange portion 73 may be pressed. In addition, the 2-1-th punch 230a may have a 2-1-th insertion groove 231 in which the one side of the tube C on which the first flange portion 73 is formed may be inserted, and the second protrusion 232 may protrude from the center of the 2-1-th insertion groove 231 so as to be inserted into an inner side of the tube C on which the first flange portion 73 is formed. In addition, the 2-1-th punch 230a may be formed as a 2-2-molding surface 233, in which a right side adjacent to the 2-1-th insertion groove 231 is a curved surface corresponding to a shape to be molded. In addition, the 2-2-th punch 230a may have a 2-1-th insertion groove 231 into which one side of the tube C on which the first flange portion 73 is formed may be inserted, and a right side adjacent to the 2-1-th insertion groove 231 may be formed as a 2-2-th molding surface 233. In addition, a second bottom surface 234 of the 2-1-th insertion groove 231 of the 2-2-punch 230b may be concavely formed on the 2-2-th molding surface 133 in the form corresponding or similar to the shape of the 2-2 molding surface 233.

<Method for Manufacturing Integrated Connector>

Hereinafter, a manufacturing method for manufacturing an integrated connector using the apparatus for manufacturing the integrated connector as described above will be described.

First, a method for manufacturing an integrated connector according to an embodiment of the present invention may generally include a first forming step and a second forming step, and may further include a compression reinforcing step performed before the first forming step.

Figure 18:
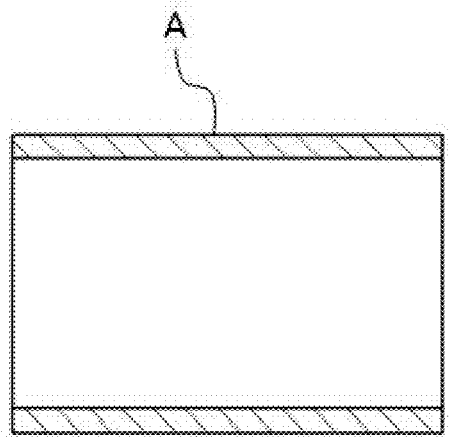
FIG. 18 is a cross-sectional view illustrating shapes of an object to be molded before and after molding in a compression reinforcing step in a method for manufacturing an integrated connector according to an embodiment of the present invention.
Figure 18:
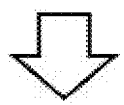
Figure 18:
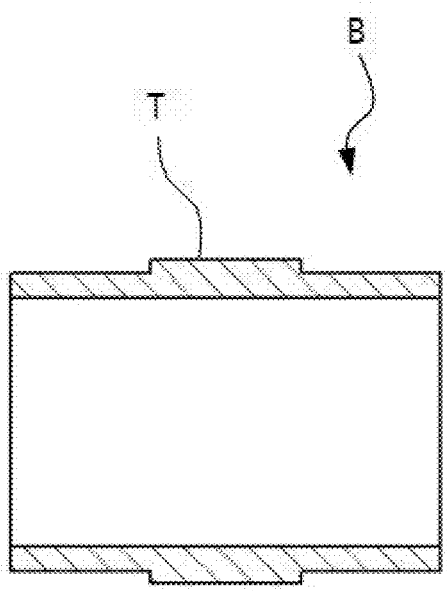

FIG. 18 is a cross-sectional view illustrating a shape of a molding object before and after molding in a compression reinforcing step in a method for manufacturing an integrated connector according to an embodiment of the present invention.

Referring to FIG. 18, a compress reinforcing step is a step in which a central portion of the tube having a constant thickness protrudes outward to form a thickness increasing portion T having a relatively increased thickness, by pressing the tube A having the constant thickness in a length direction in a state in which one side of the tube A having the constant thickness, which is an object to be molded, is fixed and the other side thereof is supported. In this case, the compress reinforcing step may be performed by using the compression reinforcing apparatus described above. In the compression reinforcing step, the compression reinforcing apparatus supports both ends of the tube A having the constant thickness, which is the object to be molded, in the length direction and the inside of the tube A having the constant thickness, and a space is formed with a groove of a predetermined shape in a region corresponding to the portion to be increased in thickness, such that the thickness increasing portion T may be formed at a predetermined position with a predetermined thickness and length when the tube A having the constant thickness is pressed and compressed in the length direction. More specifically, the tube A having the constant thickness, which is the object to be molded, is inserted into the fixing table 310, and in this state, the fixing table 310 and the tube A having the constant thickness are fixed to the clamp 320 together. Thereafter, the punch 330 is moved forward toward the clamp 320 to press and compress the tube A having the constant thickness to form a thickness increasing portion T. Thereafter, the punch 330 is moved backward and the clamp 320 is separated to obtain a tube B having an increased thickness of a central portion. Thus, it is possible to form the tube B having the increased thickness of the central portion through the compression reinforcing step. Here, when a thickness of the tube A having the constant thickness is 1.0 mm, a thickness of the thickness increasing portion T after the compression reinforcing step may be 1.10 mm to 1.75 mm (10% to 75% increased thickness of the thickness before molding). This is because, when the thickness of the thickness increasing portion T is thinner than 1.1 mm, durability is not satisfied at a folded and overlapped portion formed after the following steps of the first forming step and the second forming step, and when the thickness of the thickness increasing portion T is thicker than 1.75 mm, a cladding member attached to the surface is dropped and lost in the folded and overlapped portion formed after going through the following steps of the first forming step and the second forming step, thereby causing airtightness not to be maintained at a portion where the header tank and the gas-liquid separator are bonded to each other when the header tank and the gas-liquid separator of the heat exchanger are assembled and brazed. In addition, when the first forming step and the second forming step are performed using the tube B having the increased thickness of the central part through the compression reinforcing step, the thickness of the connection portion connecting between the first flange portion and the second flange portion becomes thicker compared to the thickness of the first pipe portion and the second pipe portion, which are both pipe portions in the length direction, and as a result, the strength of the manufactured integrated connector may be increased.

Figure 19:
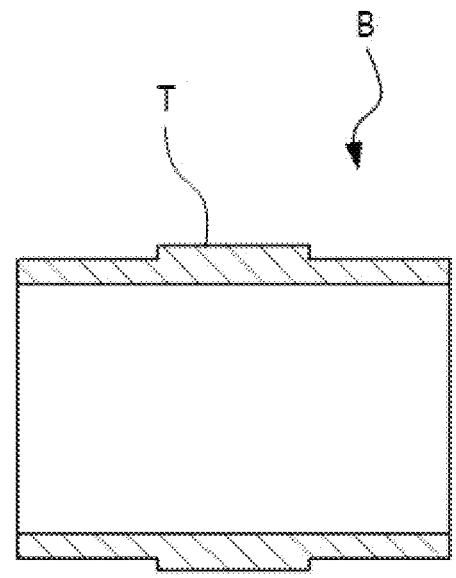
FIG. 19 is a cross-sectional view illustrating shapes of an object to be molded before and after molding in a first forming step in the method for manufacturing the integrated connector according to an embodiment of the present invention.
Figure 19:
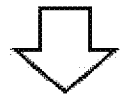
Figure 19:
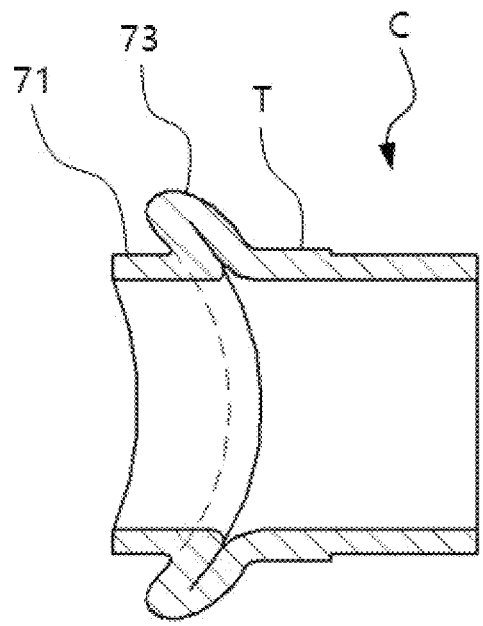

FIG. 19 is a cross-sectional view illustrating shapes of an object to be molded before and after molding in a first forming step in the method for manufacturing the integrated connector according to an embodiment of the present invention.

Referring to FIG. 19, in the first forming step, a first flange portion 73 is formed by using the tube B having the increased thickness of the central portion through the compression reinforcing step. That is, in the first forming step, the first flange portion 73 is formed in a form in which the tube is externally overlapped and stacked at the central portion of the tube B by pressing the tube B having the increasing thickness of the central portion in a state in which one side of the tube B having the increased thickness of the central portion, which is the object to be molded, is fixed and the other side thereof is supported. In this case, the first forming step may be performed by using the first forming apparatus described above. In the first forming step, the first forming apparatus supports both ends of the tube B having the increased thickness of the central portion, which is the object to be molded, in the length direction and also supports the inside thereof, and a space is formed with molding surfaces of a predetermined shape in a region corresponding to the portion on which the first flange portion 73 is to formed, such that the first flange portion 73 may be formed at a predetermined position with a predetermined dimension and shape, when the tube B having the increased thickness of the central portion is pressed and compressed in the length direction. More specifically, in the first forming step, one side of the tube B having the increased thickness of the central portion is inserted into the first fixing table 110, and in this state, the first fixing table 110 and the tube B having the increased thickness of the central portion are fixed to the first clamp 120 together. Thereafter, in a state in which the 1-1-th punch 130*a* is disposed at a position corresponding to the first clamp 120, the 1-1-th punch 130*a* is moved forward toward the first clamp 120 to first press and compress the tube B having the increased thickness of the central portion to thereby form the first flange portion 73, and then the 1-1-th punch 130*a* is moved backward. Next, the 1-2-th punch 130*b* may be moved to a position corresponding to the first clamp 120 and then moved forward toward the first clamp 120 to compress the first flange portion 73 and the first pipe portion 71 again, thereby molding the final shape of the first flange portion 73 and the first pipe portion 71 in a desired shape, and then moved backward. As a result, a tube C on which the first flange portion 73 is formed may be obtained through the first forming step.

FIG. 20 is a cross-sectional view illustrating shapes of an object to be molded before and after molding in a second forming step in the method of manufacturing the integrated connector according to an embodiment of the present invention.

Referring to FIG. 20, in the second forming step, a second flange portion 74 is further formed by using the tube C on which the first flange portion 73 is formed through the first forming step. That is, in the second forming step, the second flange portion 74 is formed in a form in which the tube is externally overlapped and stacked at a portion of the tube C adjacent to the first flange portion 73 by pressing the tube C on which the first flange portion 73 is formed in a state in which the other side of the tube C on which the first flange portion 73 is formed, which is the object to be molded, is fixed and one side thereof is supported. In this case, the second forming step may be performed by using the second forming apparatus 200 described above. In the second forming step, the second forming apparatus supports both ends of the tube C on which the first flange portion 73 is formed, which is the object to be molded, in the length direction and also supports the inside thereof, and a space is formed with molding surfaces of a predetermined shape in a region corresponding to the portion on which the second flange portion 74 is to formed, such that the second flange portion may be formed at a predetermined position with a predetermined dimension and shape, when the tube C on which the first flange portion 73 is formed is pressed and compressed in the length direction. More specifically, in the second forming step, the tube C on which the first flange portion 73 is formed is fixed to the second fixing table 210, and by turning the tube C on which the first flange portion 73 is formed, formed through the first forming step so that one side and the other side thereof come to the opposite positions, the first pipe portion 71 on the side where the first flange portion 73 is disposed is inserted into the second fixing table 210. In this state, the second fixing table 210 and the tube C on which the first flange portion 73 are fixed to the second clamp 220 together. Thereafter, in a state in which the 2-1-th punch 230a is disposed at a position corresponding to the second clamp 220, the 2-1-th punch 230a is moved forward toward the second clamp 220 to press and compress the tube C on which the first flange portion 73 is formed to thereby form the second flange portion 74, and then the 2-1-th punch 230a is moved backward. Next, the 2-2-th punch 230b may be moved to a position corresponding to the second clamp 220 and then moved forward toward the second clamp 220 to compress the second flange portion 74 and the second pipe portion 72 again, thereby molding the final shape of the second flange portion 74 and the second pipe portion 72 in a desired shape, and then moved backward. In this case, a partial region between the first flange portion 73 and the second flange portion 74 is supported by the portion between the 2-1 molding surface 222 and the fixing groove 221 of the second clamp 220, such that at least a portion of the first flange portion 73 and the second flange portion 74 may be formed to be spaced apart. That is, the first flange portion 73 and the second flange portion 74 may be formed in a form in which portions of the first flange portion 73 and the second flange portion 74 are in contact with each other and the rest thereof are spaced apart from each other. As a result, after passing through the second forming step, the first flange portion 73 and the second flange portion 74 are finally formed to protrude between the first pipe portion 71 and the second pipe portion 72, and it is possible to obtain an integrated connector 70 in the form of a tube that is connected as one without a seam.

In addition, in the method for manufacturing an integrated connector according to an embodiment of the present invention described above, although it is illustrated that the first forming step and the second forming step are divided and sequentially performed, the first forming step and the second forming step may be simultaneously performed in one forming apparatus according to the technological development of the manufacturing apparatus.

According to the integrated connector and the heat exchanger including the same according to the present invention, since the connector that firmly couples the header tank and the gas-liquid separator while connecting the header tank and the gas-liquid separator so that the heat exchange medium is communicated may be manufactured with the precise dimensions, there is an advantage in that assembly failure and leakage of the heat exchanger may be prevented.

In addition, since the coupling strength between an object to be coupled and the integrated connector is increased, the thickness of the material for manufacturing the integrated connector may be reduced, thereby reducing the manufacturing cost.

The present invention is not limited to the above-described embodiments, and may be variously applied. In addition, the present invention may be variously modified by those skilled in the art to which the present invention pertains without departing from the spirit of the present invention claimed in the claims.

[Detailed Description of Main Elements]

| | |
|---|---|
| 10: first header tank | 20: second header tank |
| 30: tube | 40: radiation fin |
| 60: gas-liquid separator | |
| 70: integrated connector | |
| 71: first pipe portion | 72: second pipe portion |
| 73: first flange portion | 73a: first seating surface |
| 74: second flange portion | 74a: second seating surface |
| 75a, 75b: first bent portion | 76a, 76b: second bent portion |
| 77: connection portion | |
| A: tube having constant thickness | |
| B: tube having increased thickness of central portion | |
| C: tube on which first flange portion is formed | |
| T: thickness increase portion | |
| 100: first forming apparatus | |
| 110: first fixing table | 111: first insertion portion |
| 112: first stepped portion | |
| 113: first locking protrusion | |
| 120: first clamp | 120a: first upper clamp |
| 120b: first lower clamp | 121: first fixing groove |
| 122: 1-1-th molding surface | |
| 123: first locking groove | |
| 130: first punch | 130a: 1-1-th punch |
| 130b: 1-2-th punch | 131: first insertion groove |
| 132: first protrusion | 133: 1-2-th molding surface |
| 134: first bottom surface | |
| 200: second forming apparatus | |
| 210: second fixing table | |
| 211: second insertion groove | |
| 212: support surface | |
| 220: second clamp | 220a: second upper clamp |
| 220b: second lower clamp | 221: second fixing groove |
| 222: 2-1-th molding surface | |
| 230: second punch | 230a: 2-1-th punch |
| 230b: 2-2-th punch | 231: 2-1-th insertion groove |
| 232: second protrusion | 233: 2-2-th molding surface |
| 234: second bottom surface | |
| 300: compression reinforcing apparatus | |
| 310: fixing table | 311: insertion portion |
| 312: stepped portion | 313: locking protrusion |
| 320: clamp | 320a: upper clamp |
| 320b: lower clamp | 321: fixing groove |
| 322: expansion groove | |
| 323: locking groove | |
| 324: guide pin | 325: guide hole |
| 330: punch | 331: insertion groove |
| 332: protrusion | |

What is claimed is:

1. An integrated connector comprising:
a first pipe portion and a second pipe portion formed in a tubular shape; and
a first flange portion and a second flange portion positioned between the first pipe portion and the second pipe portion, and formed in a form in which tubes are overlapped and stacked outwardly from opposite end portions of the first pipe portion and the second pipe portion,
wherein the first pipe portion, the second pipe portion, the first flange portion, and the second flange portion are integrally formed to form an interior communicating with each other;
further comprising:
a first bent portion connecting the first pipe portion and the first flange portion, and the second pipe portion and the second flange portion, respectively;
a second bent portion connecting a stacked outer portion of the first flange portion in a radial direction and a stacked outer portion of the second flange portion in a radial direction; and a connection portion connecting the first flange portion and the second flange portion.

2. The integrated connector of claim 1, wherein the first flange portion and the second flange portion are in contact with each other at least one or more points.

3. The integrated connector of claim 1, wherein a connection portion connecting the first flange portion and the second flange portion has a thickness greater than a thickness of the ends of the first pipe portion and the second pipe portion.

4. The integrated connector of claim 1, wherein the first pipe portion, the second pipe portion, the first flange portion, and the second flange portion are integrally formed in a form connected to one another through a forming process of forming the first flange portion and the second flange portion in a bent and overlapped form by compressing one tube.

5. The integrated connector of claim 1, wherein the first flange portion is formed in a form in which a portion of the first flange portion is inclined toward the first pipe portion, and the second flange portion is formed in a form in which a portion of the second flange portion is inclined toward the second pipe portion.

6. The integrated connector of claim 5, wherein the first flange portion is formed to surround an outer circumferential surface of the first pipe portion, and the second flange portion is formed to surround an outer circumferential surface of the second pipe portion.

7. The integrated connector of claim 5, wherein a first seating surface of the first flange portion adjacent to the first pipe portion is formed in a shape corresponding to an outer surface of one object to be in surface contact and coupled, and a second seating surface of the second flange portion adjacent to the second pipe portion is formed in a shape corresponding to an outer surface of the other object to be in surface contact and coupled.

8. The integrated connector of claim 1, wherein a thickness of one layer of the first flange portion and the second flange portion is formed to be greater than a thickness of the ends of the first pipe portion and the second pipe portion.

9. A heat exchanger comprising:
one or more header tanks in which a heat exchange medium is stored and flows;
a core portion connected to the header tanks to allow the heat exchange medium to flow and heat exchange;
a gas-liquid separator disposed to be adjacent to the header tanks and spaced apart from each other; and
the integrated connector of claim 1 for connecting the header tanks and the gas-liquid separator to communicate with each other.

10. The heat exchanger of claim 9, wherein the integrated connector is coupled by the first pipe portion being inserted into a hole of a first header tank, the first flange portion being in surface contact and coupled with an outer surface of the first header tank, the second pipe portion being inserted into a hole of the gas-liquid separator, and the second flange portion being in surface contact and coupled with an outer surface of the gas-liquid separator.

* * * * *